US009781117B2

(12) United States Patent
Swanson et al.

(10) Patent No.: US 9,781,117 B2
(45) Date of Patent: *Oct. 3, 2017

(54) MULTINODE HUBS FOR TRUSTED COMPUTING

(71) Applicant: Intel Corporation, Santa Clara, CA (US)

(72) Inventors: Robert C. Swanson, Olympia, WA (US); Daniel Nemiroff, El Dorado Hills, CA (US); Vincent J. Zimmer, Federal Way, WA (US); Mallik Bulusu, Olympia, WA (US); John R. Lindsley, Tacoma, WA (US); Robert W. Cone, Portland, OR (US); Malay Trivedi, Chandler, AZ (US); Piotr Kwidzinski, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,799

(22) Filed: Jul. 7, 2016

(65) Prior Publication Data

US 2016/0323284 A1    Nov. 3, 2016

Related U.S. Application Data

(63) Continuation of application No. 14/225,140, filed on Mar. 25, 2014, now Pat. No. 9,413,765.

(51) Int. Cl.
*G06F 3/06* (2006.01)
*H04L 29/06* (2006.01)
(Continued)

(52) U.S. Cl.
CPC ............ *H04L 63/10* (2013.01); *G06F 3/0622* (2013.01); *G06F 3/0637* (2013.01);
(Continued)

(58) Field of Classification Search
CPC ....................................................... H04L 63/10
See application file for complete search history.

(56) References Cited

U.S. PATENT DOCUMENTS 7,200,758 B2   4/2007  Zimmer
8,214,573 B2   7/2012  Zimmer et al.
(Continued)

FOREIGN PATENT DOCUMENTS

TW        200945198 A    11/2009
WO   WO 2011-078855 A1    6/2011

OTHER PUBLICATIONS

International Preliminary Report on Patentability mailed Oct. 6, 2016 for International Application No. PCT/US2015/013942, 10 pages.

(Continued)

*Primary Examiner* — Oleg Korsak
(74) *Attorney, Agent, or Firm* — Schwabe, Williamson & Wyatt, P.C.

(57) ABSTRACT

Embodiments of multinode hubs for trust operations are disclosed herein. In some embodiments, a multinode hub may include a plurality of memory regions, a trapping module, and a trusted platform module (TPM) component. Each memory region may be associated with and receive trust operation data from a coherent computing node. The trapping module may generate trap notifications in response to accesses to the plurality of memory regions by the associated coherent computing nodes. The trap notifications may indicate which of the plurality of memory locations has been accessed, and the TPM component may process the trust operation data in a memory region indicated by a trap notification. Other embodiments may be disclosed and/or claimed.

19 Claims, 4 Drawing Sheets

(51) Int. Cl.
*G06F 21/55* (2013.01)
*G06F 21/57* (2013.01)
*G06F 13/28* (2006.01)

(52) U.S. Cl.
CPC .......... *G06F 3/0683* (2013.01); *G06F 21/554* (2013.01); *G06F 21/57* (2013.01); *G06F 21/572* (2013.01); *G06F 13/28* (2013.01)

(56) References Cited

U.S. PATENT DOCUMENTS

| | | |
|---|---|---|
| 8,335,931 B2 | 12/2012 | Lee et al. |
| 2004/0177261 A1 | 9/2004 | Watt et al. |
| 2005/0262571 A1 | 11/2005 | Zimmer et al. |
| 2006/0107328 A1 | 5/2006 | Frank et al. |
| 2009/0007104 A1 | 1/2009 | Zimmer et al. |
| 2009/0044187 A1 | 2/2009 | Smith et al. |
| 2009/0063835 A1 | 3/2009 | Yao et al. |
| 2009/0172806 A1 | 7/2009 | Natu et al. |
| 2009/0259845 A1 | 10/2009 | Sutton, II et al. |
| 2012/0159184 A1 | 6/2012 | Johnson et al. |
| 2015/0254017 A1 | 9/2015 | Soja et al. |

OTHER PUBLICATIONS

International Search Report and Written Opinion mailed Apr. 21, 2015 for International Application No. PCT/US2015/013942, 14 pages.
Search Report mailed Dec. 28, 2015 for Taiwan Patent Application No. 104104265, 2 pages.
Zimmer, Vincent J. et al. "Trusted Platforms—UEFI, PI and TCG-based firmware", Sep. 2009, 50 pages.
Office Action dated Mar. 14, 2017 for Korean Patent Application No. 2016-7023218, 4 pages.

MULTINODE HUBS FOR TRUSTED COMPUTING

RELATED APPLICATION

This application is a continuation of, and claims priority to, U.S. patent application Ser. No. 14/225,140, entitled "Multinode Hubs for Trusted Computing," filed on Mar. 25, 2014, now U.S. Pat. No. 9,413,765, issued Aug. 9, 2016. The Specification of application Ser. No. 14/225,140 is hereby fully incorporated by reference.

TECHNICAL FIELD

The present disclosure relates generally to the field of trusted computing, and more particularly, to multinode hubs for trusted computing.

BACKGROUND

Trusted Platform Module (TPM) hardware is used in many computing devices to provide a root of trust for operation of the device. TPM hardware is typically implemented as a discrete chipset, and one TPM hardware unit is associated with each coherent computing node of an integrated circuit (IC) package. Traditional IC packages have only included a single coherent computing node (and consequently a single TPM chipset); however, some current and future packages may include two, four or more coherent computing nodes. Including discrete TPM chipsets for each node in a multinode IC package may occupy a large device footprint and require significant resources, which may limit the benefits of including multiple nodes in an IC package. Existing TPM chipsets, however, interface with only a single node, and thus existing systems are constrained to duplicate such TPM chipsets in a multinode package.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
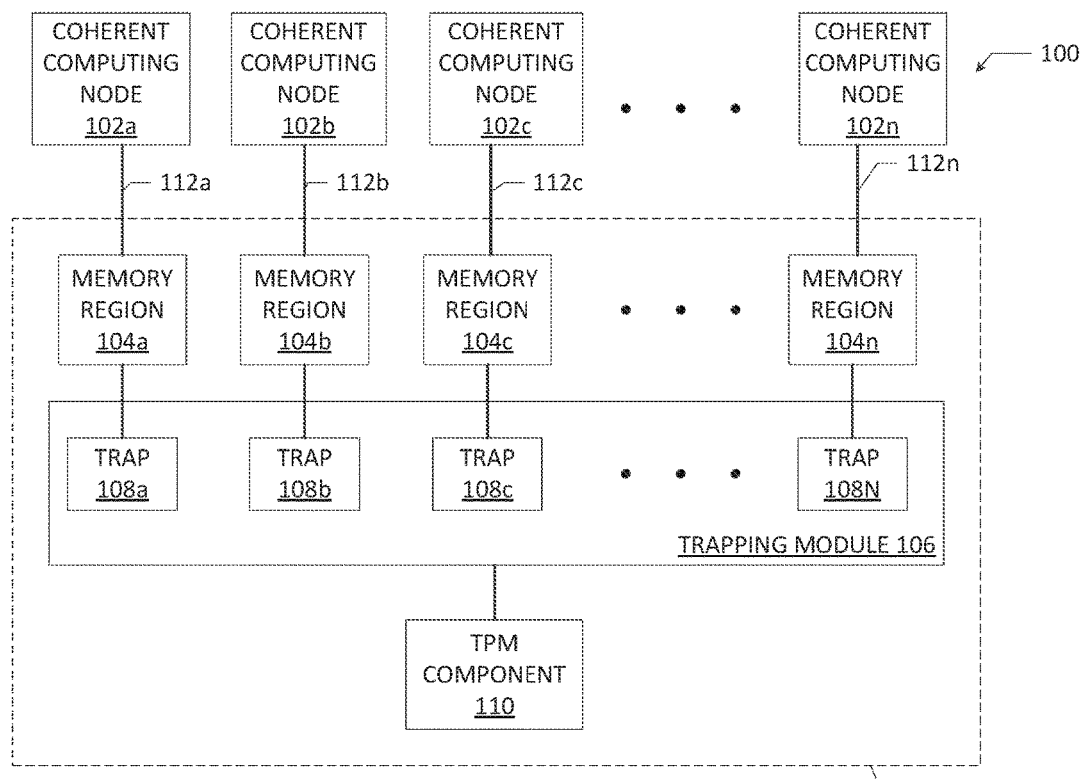
FIG. 1 is a block diagram of a computing system including a multinode hub, in accordance with various embodiments.

Embodiments of multinode hubs for trust operations are disclosed herein. In some embodiments, a multinode hub may include a plurality of memory regions, a trapping module, and a trusted platform module (TPM) component. Each memory region may be associated with and receive trust operation data from a coherent computing node. The trapping module may generate trap notifications in response to accesses to the plurality of memory regions by the associated coherent computing nodes. The trap notifications may indicate which of the plurality of memory locations has been accessed, and the TPM component may process the trust operation data in a memory region indicated by a trap notification.

Various embodiments of the multinode hubs disclosed herein may provide a trusted computing solution in a platform controller hub that scales sustainably with the number of coherent computing nodes in an IC package. In particular, various embodiments disclosed herein overcome the inability of existing TPMs to operate with more than one coherent computing node. This inability is based at least in part on the interfaces between existing TPMs and nodes (e.g., low pin count (LPC), serial peripheral interface (SPI) and enhanced SPI (eSPI)), which are not operable beyond a single coherent link. Consequently, implementing TPM functionality in multinode packages using conventional approaches may require duplicating TPM chipsets for each node in the package.

In some embodiments, the multinode hubs disclosed herein may multiplex an embedded security processor (e.g., the TPM component 110 discussed below) in a system-on-a-chip (SoC), rack scale architecture for the cloud, or micro server at apology. Additionally, embodiments of the multinode hubs disclosed herein may appear, from the perspective of a coherent computing node, to be a TPM dedicated to that coherent computing node (even though the TPM functionality may be shared among multiple coherent computing nodes). The multinode hubs disclosed herein may be implemented as part of an overall security architecture that uses TPM functionality that many stages along the device pathway (e.g., from server to handheld). In some embodiments, the multinode hubs may provide buffers for each of multiple nodes and protection of secrets between the nodes for rack scale architecture, microserver topologies and others. The multinode hubs and related techniques disclosed herein may improve the resilience of computing systems to malicious attack by enabling tamper detection in an efficient manner.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the terms "module" or "component" may refer to, be part of, or include an Application Specific Integrated Circuit (ASIC), an electronic circuit, a processor (shared, dedicated, or group) and/or memory (shared, dedicated, or group) that executes one or more software or firmware programs, a combinational logic circuit, and/or other suitable components that provide the described functionality. As used herein, a "TPM" may refer to components of a computing device that may improve the security of operations of the computing device by performing cryptographic operations, recording measurements of platform components (e.g., the Basic Input/Output Operating System (BIOS), hypervisors, or other software components). As used herein, "BIOS" may refer to an interface between an operating system and platform firmware, and may include Unified Extensible Firmware Interface (UEFI).

FIG. 1 is a block diagram of a computing system 100 including a multinode hub 120, in accordance with various embodiments. The computing system 100 may include multiple coherent computing nodes 102a-n, which may be coupled with the multinode hub 120. As used herein, "n" may represent any desired integer value greater than or equal to two. References to a "coherent computing node 102" may refer to any one or more of the coherent computing nodes 102a-n. Although various elements of the computing system 100 may be discussed below and illustrated in FIG. 1 as discrete elements, various elements may be combined or rearranged as suitable. For example, in some embodiments, the memory regions 104a-n may be included in the TPM component 110. In some embodiments, the trapping module 106 may be included in the TPM component 110. These examples are simply illustrative, and any combination or rearrangement consistent with the techniques disclosed herein may be implemented.

In some embodiments, the multinode hub 120 may be implemented at least in part in firmware programmed into appropriate hardware. For example, in some embodiments, firmware associated with the multinode hub 120 may be disposed in a non-re-writable memory. In some embodiments, firmware associated with the multinode hub 120 may be included in a UEFI Platform Initialization (PI) System Management Mode (SMM) driver, as discussed in additional detail below.

As shown in FIG. 1, individual coherent computing nodes 102a-n may be coupled with associated memory regions 104a-n of the multinode hub 120 via associated communication links 112a-n, respectively. References to a "memory region 104" or a "communication link 112" may refer to any one or more of the memory regions 104a-n or the communication links 112a-n, respectively. The memory regions 104a-n may receive trust operation data from the associated coherent computing nodes 102a-n via the associated communication links 112a-n. In some embodiments, each of the communication links 112a-n may include one or more serial or parallel buses enabling communication between the coherent computing nodes 102a-n and the memory regions 104a-n. The memory regions 104a-n may be contiguous blocks of memory in a common memory device, discontiguous blocks of memory, distributed among a single or multiple memory devices, or distributed in any suitable manner.

The memory regions 104a-n may receive trust operation data from the associated coherent computing nodes 102a-n in any of a number of ways. For example, in some embodiments, a memory region 104 may receive trust operation data from an operating system (OS) of the associated coherent computing node 102. In some embodiments, a memory region 104 may receive trust operation data from the associated coherent computing node 102 via a Direct Memory Access (DMA) transfer from the associated coherent computing node 102.

In some embodiments, each coherent computing node 102 may include an Advanced Configuration and Power Interface (ACPI) table, which may include a base address of the associated memory region 104, as discussed in additional detail below. In some embodiments, the memory regions 104a-n may be DMA buffers allocated by the BIOS of the associated coherent computing nodes 102a-n, respectively. In some embodiments, the memory regions 104a-n may be secured from each other. For example, in some embodiments, security may be achieved by implementing channels on a per coherent computing node or per context basis (e.g., each coherent computing node and/or context may be paired with a channel by suitable hardware). In some embodiments, the multinode hub 120 may encrypt each secret with a different seed key or apply page table protections. Such embodiments may be advantageous when processors included in the multinode hub 120 support such features (e.g., an x86 processor).

The memory regions 104a-n may be coupled with a trapping module 106. The trapping module 106 may be configured to generate trap notifications in response to accesses to the memory regions 104a-n by the associated coherent computing nodes 102a-n. For example, in some embodiments, the trapping module 106 may detect an attempt by the coherent computing node 102a to write data to the memory region 104a and may "doorbell" this attempt to the TPM component 110 (which may trigger the TPM component 110 to process the written data, as discussed below). In some embodiments, as illustrated in FIG. 1, the trapping module 106 may include trap hardware 108a-n. Each of the trap hardware 108a-n may be associated with a different one of the memory regions 104a-n, and may be configured to detect accesses to the associated memory regions 104a-n by the associated coherent computing nodes 102a-n. In some embodiments, a trap notification generated by the trapping module 106 may indicate which of the memory regions 104a-n has been accessed. In some embodiments, the trapping module 106 may be a low level kernel driver that oversees all communication going to the TPM component 110. In some embodiments, the trapping module 106 may use hardware interrupts or a filter driver.

In some embodiments, the trapping module 106 may include a chip having a number of readable and writable registers that may be used to specify a set of input/output (I/O) cycles to be trapped and to enable the trapping functionality. In some embodiments, accesses to the memory regions 104a-n may be trapped by hardware in the multinode hub 120 may be notified. These notifications may include an indication of the coherent computing node 102 that accessed the corresponding memory region 104.

In some embodiments, the trapping module 106 may be included in or in communication with a legacy block (not shown). A legacy block may include one or more hardware blocks that support platform features for any number of previous hardware configurations. Examples of hardware blocks that may be included in a legacy block include LPC interface hardware (traditionally used to communicate with hardware TPMs) and input/output (I/O) advanced programmable interrupt controller (APIC) hardware. In some such embodiments, the trapping module 106 may detect and trap attempts to invoke TPM-related functions using legacy configurations, and route these attempts to the TPM component 110 for appropriate processing. This may enable the use of the multinode hubs 120 disclosed herein with legacy hardware (e.g., LPC-based hardware or Trusted Execution Technology hardware for validating the integrity of BIOS or hypervisors).

In some embodiments, the multinode hub 120 may receive notification of other actions of the coherent computing nodes 102a-n. For example, the multinode hub 120 may receive notification of power state transitions (e.g., S0, S3, S5, etc.) of the coherent computing nodes 102a-n. This may allow the multinode hub 120 to avoid improper power state transitions (e.g., improperly sending the coherent computing node 102a to power state S5 while also sending the coherent computing node 102b to power state S5).

The trapping module 106 may be coupled with a trusted platform module (TPM) component 110. The TPM component 110 may be configured to perform trust-related operations as specified by the Trusted Computing Group standard or any other desired operation. For example, the TPM component 110 may be configured to perform the operations performed by hardware-based TPMs (e.g., the TPM chipsets discussed above). In some embodiments, the TPM component 110 may be configured in accordance with the Platform Trust Technology standard.

In the multinode hub 120, the TPM component 110 may be configured to process trust operation data in response to trap notifications. In particular, the TPM component 110 may be configured to process trust operation data from a memory region (e.g., of the memory regions 104a-n) indicated in the trap notification as accessed by an associated coherent computing node (e.g., of the coherent computing nodes 102a-n).

The TPM component 110 may process the trust operation data from a memory region 104 in any of a number of ways. For example, in some embodiments, the TPM component 110 may verify an integrity of a BIOS of the coherent computing node 102 associated with the memory region 104. The TPM component 110 may verify a launch of a hypervisor by the coherent computing node 102 associated with the memory region 104. These trust operation data processing examples are simply illustrative, and the TPM component 110 may perform remote attestation, the sealing of secrets, drive encryption, password protection, and providing the root of trust for the computing system 100, among other operations. In some embodiments, the TPM component 110 may include a memory used by the TPM component 110 to process trust operation data from memory regions 104 associated with two or more different coherent computing nodes 102, as discussed in additional detail below.

In some embodiments, the TPM component 110 may return results of trust operation data processing to appropriate ones of the coherent computing nodes 102a-n. In some embodiments, the TPM component 110 may return these results to the memory regions 104a-n. For example, when the TPM component 110 processes trust operation data from the memory region 104a, the TPM component 110 may return the results of the trust operation data processing to the memory region 104a (e.g., to a command-response buffer of the memory region 104a, as discussed below with reference to FIG. 3). In some embodiments, the TPM component 110 may return the results of trust operation data processing to the memory regions 104a-n through one or more general-purpose DMA (GPDMA) transfer (not illustrated in FIG. 1). In some embodiments, the multinode hub 120 may include a different GPDMA pathway between the TPM component 110 and each of the memory regions 104a-n. As noted above, in some embodiments, the memory regions 104a-n may be BIOS allocated DMA buffers.

In some embodiments, the trapping module 106 may be configured to trap block or trap (e.g., transmit a trap notification to the TPM component 110 indicating the access of a memory location 104 but preventing the contents submitted to the memory location 104 from being stored in the memory location 104). In some embodiments, the trapping module 106 may be configured to write through (e.g., the trap notification may be transmitted to the TPM component 110 concurrently with writing data to the memory location 104). In some embodiments, the trapping module 106 may be configured to trap and drain (e.g., transmit a trap notification to the TPM component 110 and eventually allowing the contents submitted to the memory location 104 to be stored in the memory location 104). In various embodiments, notification and storage of data in the memory location 104 may be synchronous (e.g., upon notification, the data may be written to the memory location 104 so that the TPM component 110 may operate on the data).

The components of the computing system 100 may be distributed among one or more hardware elements in any of a number of ways. For example, in some embodiments, the multinode hub 120 may be included in an integrated circuit (IC) package along with two or more of the coherent computing nodes 102a-n. In some embodiments, the multinode hub 120 may be included in an IC package that is separate from a package including at least one of the coherent computing nodes 102a-n. In some embodiments, the multinode hub 120 may be included in an IC package that is separate from one or more packages including all of the coherent computing nodes 102a-n. For example, the coherent computing nodes 102a-n in such embodiments may include one or more microserver systems-on-a-chip (SoCs). In some such embodiments, the communication links 112a-n and may be configured to support Enhanced Serial Peripheral Interface (eSPI), Inter-Integrated Circuit (I2C)/System Management Bus (SMBus), alert and error pins, Platform Environment Control Interface (PECI), Peripheral Component Interconnect Express (PCIe), Universal Asynchronous Receiver/Transmitter (UART), or any other desired communication protocol.

In some embodiments, one or more components of the multinode hub 120 may be included in a manageability engine (ME). In some embodiments, the ME may be a Converged Security and Manageability Engine (CSME) having firmware included in a non-re-writable memory so that it cannot be tampered with by third parties. This may be desirable for maintaining the integrity of one or more components of the multinode hub 120 (e.g., the TPM component 110). In some embodiments, one or more components of the multinode hub 120 may be included in an innovation engine (IE) having re-writable memory to allow the inclusion of desired code by third parties. In some embodiments, processors included in the multinode hub 120 may have architectures that enable task isolation, page tables, data isolation and related functionality (e.g., x86 processors or ARM processors).

As noted above, in some embodiments, firmware associated with the multinode hub 120 may be included in a UEFI PI SMM driver or other macrocode firmware. Such embodiments may be useful in low power applications (e.g., low power SoC applications) in which it is not feasible, desired, or necessary to use an additional processor for the multinode hub 120. In such embodiments, virtualization may be used to provide multiple OS functionality, if desired, but may not be needed to implement other functionality of the multinode hub 120.

In some embodiments, the multinode hub 120 may provide a single hardware/firmware implementation of TPM functionality that may support all of the components of a Field Replaceable Unit (FRU) without compromising the measurement and/or attestation performance that would be provided by multiple discrete TPM chipsets. In some embodiments, the multinode hub 120 may isolate operations at a per-node, per-OS context instantiation. This may enable secure computing for coherent computing nodes that are capable of dynamic switching of OS contexts. For example, if the coherent computing node 102*a* supports dynamic switching of OS contexts between a first OS (e.g., Microsoft WINDOWS) and a second OS (e.g., Google ANDROID), the multinode hub 120 may be configured to perform trust operations for the first and second OSs. The multinode hub 120 may be configured to identify the OS requesting me trust operation due to the different signatures of different OSs. The OS identity may also be determined via ACPI (e.g., by using the _OSI method). Once the coherent computing node 102 and the particular OS are identified, a TPM instance for the node and OS may be created. In some embodiments, the multinode hub 120 may provide trust functionality for servers (e.g., rack scale architecture or microservers) as they switch from OS contexts that handle and user workloads to service partitions for maintenance, and vice versa.

Various embodiments of the coherent computing node 102, the memory region 104, and the TPM component 110 are now discussed.

Figure 2:
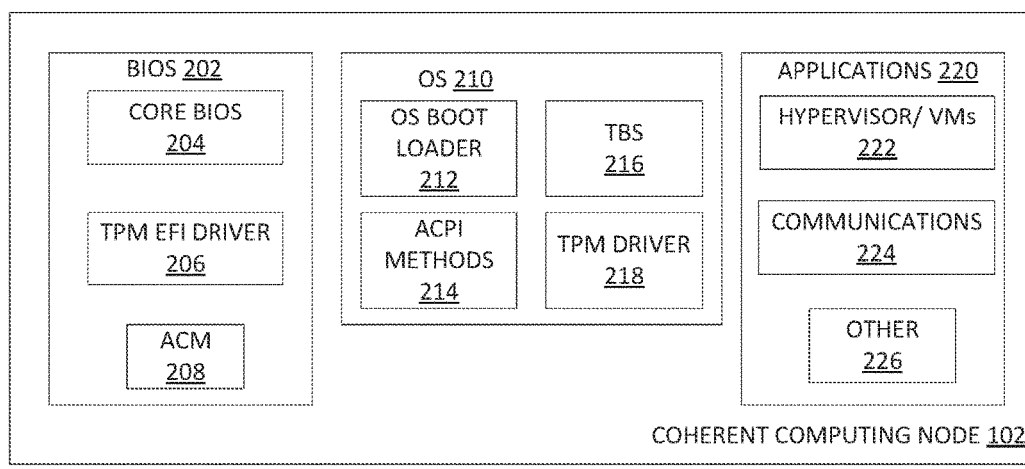
FIG. 2 is a block diagram of an illustrative coherent computing node, in accordance with various embodiments.

FIG. 2 is a block diagram of an illustrative coherent computing node 102, in accordance with various embodiments. One or more of the coherent computing nodes 102*a-n* of FIG. 1 may include some or all of the components of the coherent computing node 102 illustrated in FIG. 2.

As illustrated, the coherent computing node 102 may include a BIOS 202, and OS 210, and applications 220. The BIOS 202 may include core BIOS 204, a TPM EFI driver 206, and an Authentication Control Module (ACM) 208. In various embodiments, the BIOS 210 and its components may be implemented as firmware. The core BIOS 204 may test system components and initiate the loading of the OS 210. The TPM EFI driver 206 may be configured to communicate with the TPM component 110. For example, the TPM EFI driver 206 may be configured to enable communication between the BIOS 202 and a host controller interface of the TPM component 110 (e.g., the interface 414, discussed below). The ACM 208 may be a digitally signed component embedded in the coherent computing node 102 (e.g., by the manufacture of a chipset of the coherent computing node 102) configured to measure code of the BIOS 202 during secure startup. In some embodiments, the ACM 208 may itself be measured by a processor of the coherent computing node 102 prior to the ACM 208 measuring code of the BIOS 202.

The OS 210 may include an OS boot loader 212, TPM Base Services (TBS) 216, ACPI Methods 214, and a TPM driver 218. In various embodiments, the OS 210 and its components may be implemented as hardware configured with suitable software. The OS boot loader 212 may load the OS 210 after completion of any scheduled self-tests, and may be in communication with the core BIOS 204. The TBS 216 may manage and schedule TPM access for multiple applications in the OS 210, and may provide services as an application programming interface (API) through remote procedure calls. The ACPI Methods 214 may provide operations for configuring and querying hardware. The TPM driver 218 may enable communication between the OS 210 and the TPM component 110. In some embodiments, the TPM driver 218 may be invoked by the TBS 216. In some embodiments, the TPM driver 218 may be embodied in a TPM.sys file.

In some embodiments, before the OS 210 is booted, the BIOS 202 may initialize a TPM interface with a base address for an associated memory region and additional information relevant to the coherent computing node 102 and/or the associated memory region. For example, the BIOS 202 may allocate a DMA base address for the coherent computing node 102, and may pass that base address along with the additional information to the multinode hub 120 (where it may be stored). In some embodiments, the coherent computing node 120 may enumerate its assigned memory region via an ACPI table populated to that coherent computing node 120 by its BIOS 202. In particular, the ACPI table may include the base address of the memory region (e.g., the DMA buffer) associated with the coherent computing node 102. Various embodiments of this functionality are discussed below with reference to FIG. 5.

The applications 220 may include one or more hypervisors/virtual machines (VMs) 222, communications applications 224, and other applications 226. In some embodiments, the applications 220 may be measured by the TPM component 110 and/or may request trust operations be performed by the TPM component 110. In various embodiments, the TPM component 110 may reside underneath hypervisor's war VMs, and may also be a part of a virtualized TPM agent.

Figure 3:
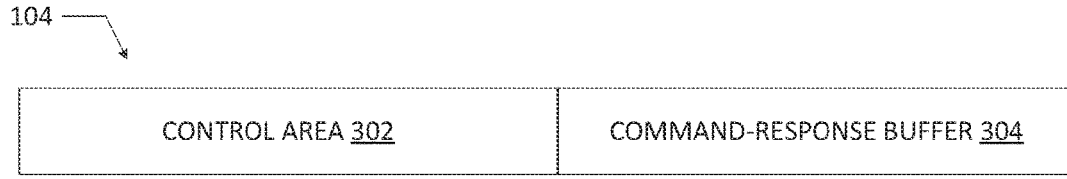
FIG. 3 depicts an illustrative memory region, in accordance with various embodiments.

FIG. 3 depicts an illustrative memory region 104, in accordance with various embodiments. The memory region 104 may include a control area 302 and a command-response buffer 304. Although the control area 302 and the command-response buffer 304 are illustrated as contiguous, this need not be the case; the control area 302 and the command-response buffer 304 may be distributed among various memory devices and locations in any suitable manner.

A coherent computing node 102 may submit a command to the TPM component 110 by writing the command to the command-response buffer 304, and may issue a write to a protocol by writing to the control area 302. For example, the command submitted to the TPM component 110 may be TPM_Seal. Upon writing the command of TPM_Seal to the command area of the command-response buffer 304, the trapping module 106 may trap the write, notify the multinode hub 120 and provide the instance of memory location, contents (TPM_Seal), OS instance, and identity of the accessing coherent computing node node 102. The multinode hub 120 may then act upon the command and resume control back after updating the response.

In some embodiments, accesses by a coherent computing node 102 to the control area 302 may be trapped by the trapping module 106 (which may include separate trap hardware 108 for different coherent computing nodes 102).

The trapping module 106 may generate a trap notification in response to the access to the control area 302, which may signal to the TPM component 110 that the associated coherent computing node 102 has a command ready to process. In some embodiments, the control area 302 and the command-response buffer may be configured in accordance with the TPM 2.0 and/or any other suitable specification.

Figure 4:
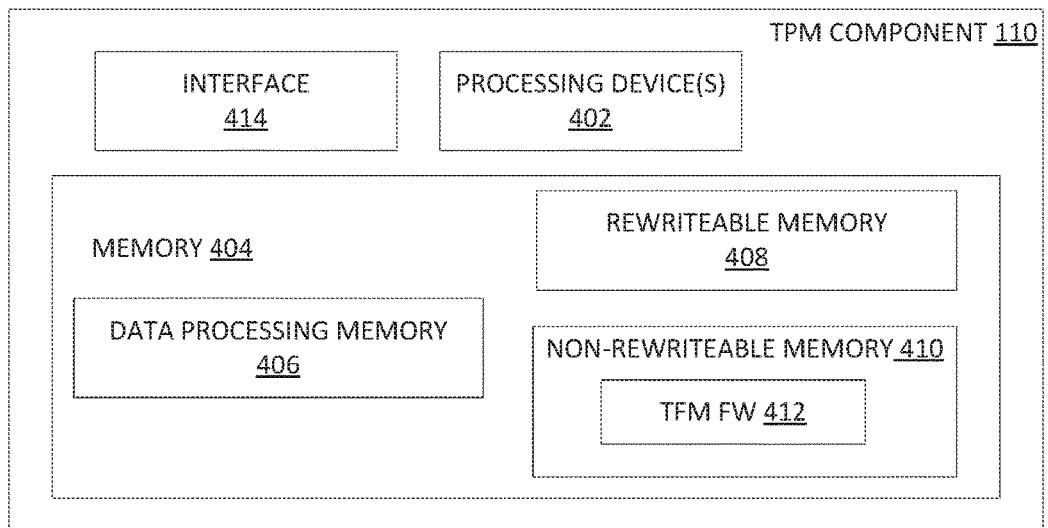
FIG. 4 is a block diagram of an illustrative TPM component, in accordance with various embodiments.

FIG. 4 is a block diagram of an illustrative TPM component 110, in accordance with various embodiments. In some embodiments, the TPM component 110 may be implemented as firmware. As noted above, in some embodiments, the TPM component 110 may be implemented as or included in an ME.

The TPM component 110 may include an interface 414, one or more processing devices 402, and a memory 404. The interface 414 may enable communication between the coherent computing nodes 102*a-n* and the TPM component 110. In some embodiments, the trapping module 106 may be included in the interface 414. In some embodiments, the identity of a coherent computing node 102 may be derived from information annotated at a platform baseboard and strapped accordingly (e.g., analogously to dual in-line memory module (DIMM) slot ID).

In some embodiments, the one or more processing devices 402 may include a microcontroller. The selection of a microcontroller for use in the TPM component 110 may depend upon the desired speed of data processing. As many common trust operations may not be particularly computationally intensive (e.g., measuring trust, secrets, integrity, and tamper detection), slower processing devices may be used without sacrificing performance. For example, in some embodiments, x86 or ARM processors may be suitable (and may be advantageous due to their support of page table isolation).

In response to the trapping module 106 generating a trap notification, the TPM component 110 may process a requested command from a coherent computing node 120 based on the trust operation data provided to the associated memory region 104. For example, in some embodiments in which the coherent computing node 102 writes to the control area 302, the TPM component 110 may DMA-in the command from the command-response buffer 304, process the command, and then DMA-out the result to the command-response buffer 304. The TPM component 110 may also DMA a "command complete" message to the control area 302. During this time, the coherent computing node 102 may have been pulling on the control area 302, waiting for the command complete message. When the coherent computing node 102 detects the command complete message, the coherent computing node 102 may consider the command to be completed. In some embodiments, the coherent computing node 102 will be notified of the command complete message by a "trap and notify" mechanism. In some embodiments, the coherent computing node 102 may poll the memory buffer.

The memory 404 may include a data processing memory 406, a re-writable memory 408, and a non-re-writable memory 410. The TPM component 110 may use the data processing memory 406 for processing trust operation data from multiple coherent computing nodes. Thus, in some embodiments, the TPM component 110 may advantageously centralize and share memory for performing trust operations for multiple coherent computing nodes, thereby reducing the memory footprint relative to multiple discrete TPM chipsets. In some embodiments, the non-re-writable memory 410 may include TPM firmware 412 (e.g., as discussed above). In some embodiments, the TPM firmware 412 may be included in the re-writable memory 408 (e.g., as discussed above with reference to Innovation Engine embodiments). In some embodiments, the TPM firmware 412 may be partially included in the rewritable memory 408 and partially included in non-re-writable memory 410. The memory 404 may include one or more types of memory such as Random Access Memory (RAM) and Flash memory, for example. In some cases, the amount of memory available to the multinode hub 120 will be limited; consequently, aligning all accesses from each coherent computing node 102 to a shared buffer may enable the provision of TPM functionality to all of the coherent computing nodes 102*a-n* while preserving scarce embedded resources.

In some embodiments, the TPM component 110 may include isolated firmware components providing trust operation data processing to different ones of the coherent computing nodes 102*a-n*. For example, the isolated firmware components may be compartmentalized into different secure containers and/or processes, which may provide an additional level of protection towards assuring that the secret data from a coherent computing node 102 is handled separate and securely from other coherent computing nodes 102. In some firmware arrangements, different firmware modules may be isolated to prevent inter-module interference. Each firmware module may be compartmentalized by creating unique instances of some or all of the TPM component 110 as modules. The firmware source may be common, but may be instantiated for each coherent computing node 102. This may represent a trade-off between redundancy and space. In embedded applications, limited resources may make this redundancy particularly expensive, and thus a singular TPM instance (accompanied by isolation of the secrets of each coherent computing node 102) may be preferred.

Figure 5:
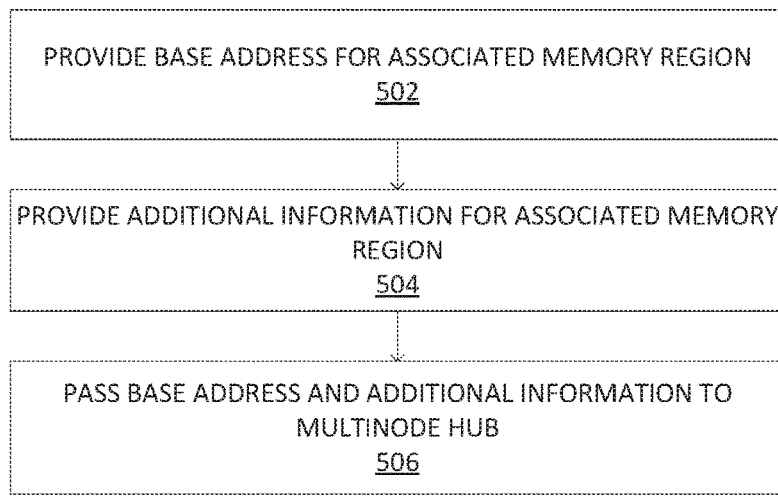
FIG. 5 is a flow diagram of an illustrative process for providing initialization information to a multinode hub, in accordance with various embodiments.

FIG. 5 is a flow diagram of an illustrative process 500 for providing initialization information to a multinode hub, in accordance with various embodiments. For illustrative purposes, operations of the process 500 may be described as performed by a coherent computing node 102 of the computing system 100, but the operations of the process 500, including individual operations of the process 500, may be performed by any suitably configured component or combination of components of the computing system 100.

The process 500 may begin at the operation 502 in which a base address for a memory region may be provided to an ACPI table. The base address may be provided at the operation 502 by the BIOS of a coherent computing node associated with the memory region (e.g., the BIOS 202 of the coherent computing node 102). In some embodiments, the base address may be used as a DMA base address for transferring data into the particular memory region via a DMA transfer operation.

At the operation 504, additional information may be retrieved from a memory of a coherent computing node associated with the memory region of the operation 502. The additional information may be descriptive of the coherent computing node, and may include, for example node ID, socket ID, memory location, and node OS instance, for example. This information may be passed to the multinode hub 120 via a control/status register (CSR) with an interrupt, for example.

At the operation 506, the base address and additional information may be passed to a TPM component of the multinode hub. For example, a coherent computing node 102 may pass the base address and additional information to the TPM component 110 of the multinode hub 120. In some embodiments, additional information any passed to the TPM component via a TPM driver, such as the TPM EFI driver 206. The process 500 may then end. Since addresses may be tagged with node-specific information, coordination between coherent computing nodes 102a-n in providing addresses may not be required. In some embodiments, an address may be tagged using the upper unused address bits.

In some embodiments, in response to receiving the base address and additional information of the operation 506, the multinode hub may execute the process 600 of FIG. 6 (discussed below) to monitor for accesses to the memory regions associated with the base addresses and additional information. The operations of the process 500 may be repeated, in series or in parallel, to pass base address and additional information to a multinode hub from different coherent computing nodes.

Figure 6:
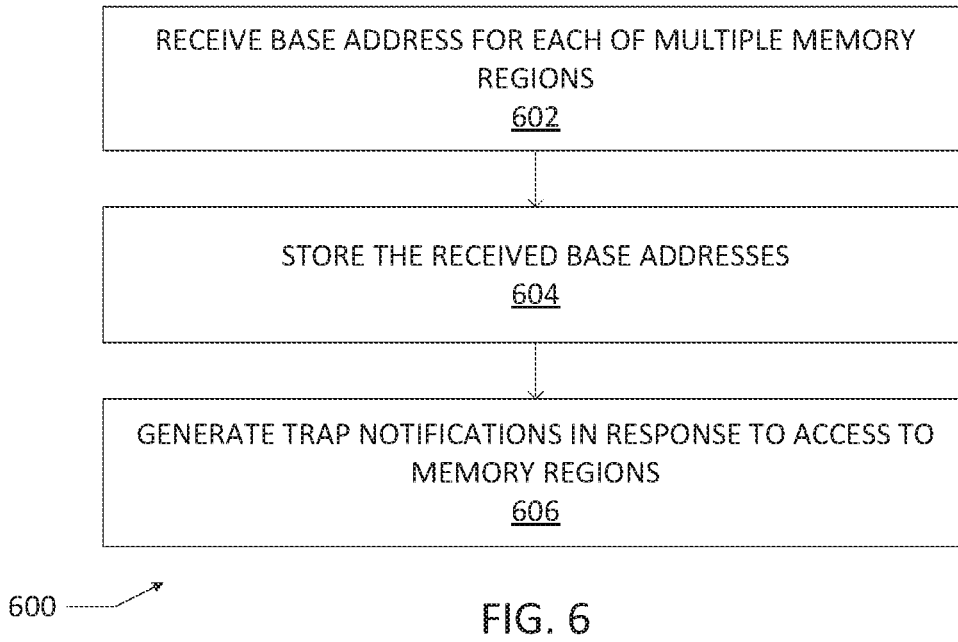
FIG. 6 is a flow diagram of an illustrative process for monitoring for accesses to memory regions, in accordance with various embodiments.

FIG. 6 is a flow diagram of an illustrative process 600 for monitoring for accesses to memory regions, in accordance with various embodiments. For illustrative purposes, operations of the process 600 may be described as performed by the trapping module 106 of the computing system 100, but the operations of the process 600, including individual operations of the process 600, may be performed by any suitably configured component or combination of components of the computing system 100.

The process 600 may begin at the operation 602 in which a base address may be received for each of a plurality of memory regions from each coherent computing node of an associated plurality of coherent computing nodes. For example, the trapping module 106 may receive a base address from each of the coherent computing nodes 102a-n, with each base address associated with a different one of the memory regions 104a-n. In some embodiments, a component other than the trapping module 106 may receive the base addresses, but the trapping module 106 may be configured to access the base addresses to generate trap notifications, as discussed below. In some embodiments, at least one of the base addresses received at the operation 602 may include a DMA base address.

At the operation 604, the received plurality of base addresses may be stored. In some embodiments, the received plurality of base addresses may be stored in the memory 404 of the TPM component 110 (e.g., in a RAM memory). In some embodiments, a received base address may be stored and allowed to persist until the coherent computing node that provided the base address is restarted and/or the multinode hub 120 is restarted.

At the operation 606, a trap notification may be generated for a TPM component. The trap notification may be generated in response to an access, by an associated coherent computing node, of a memory region of the plurality of memory regions. In some embodiments, the trap notification may indicate which of the plurality of memory regions has been accessed. The process 600 may then end.

In some embodiments, in response to receiving the trap notification generated at the operation 606, the TPM component 110 may execute the process 700 of FIG. 7 (discussed below). The operations of the process 600 may be repeated, in series or in parallel, to generate trap notifications as different ones of the coherent computing nodes 102a-n access their associated memory regions 104a-n. As noted above, in some embodiments, different trap hardware 108a-n may generate the trap notifications for accesses to different ones of the memory regions 104a-n.

Figure 7:
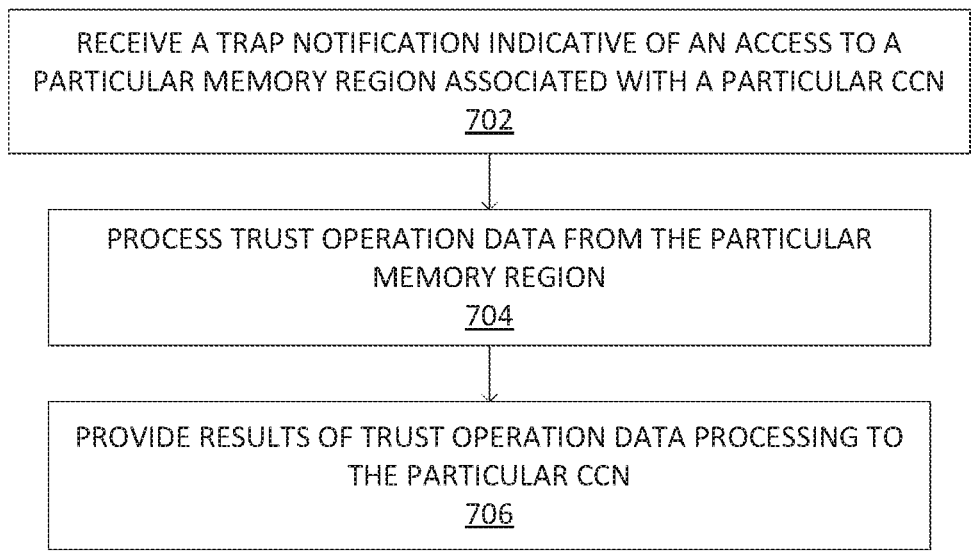
FIG. 7 is a flow diagram of an illustrative process for processing trust operation data from multiple coherent computing nodes by a TPM module, in accordance with various embodiments.

FIG. 7 is a flow diagram of an illustrative process 700 for processing trust operation data from multiple coherent computing nodes by a TPM module, in accordance with various embodiments. For illustrative purposes, operations of the process 700 may be described as performed by the TPM component 110 of the computing system 100, but the operations of the process 700, including individual operations of the process 700, may be performed by any suitably configured component or combination of components of the computing system 100.

The process 700 may begin at the operation 702 in which a trap notification may be received. The trap notification may be indicative of an access to a particular memory region associated with a particular coherent computing node. For example, the TPM component 110 may receive a trap notification from the trapping module 106. The trap notification may indicate an access to a particular memory region of the memory regions 104a-n associated with a particular coherent computing node of the coherent computing nodes 102a-n. In some embodiments, the trap notification of the operation 702 may be generated in response to an access to a particular memory region.

At the operation 704, trust operation data for the particular memory region associated with the trap notification of the operation 702 may be processed. This trust operation data may be stored in the particular memory region by a coherent computing node associated with the memory region. For example, one of the coherent computing nodes 102a-n may provide trust operation data to be stored in the associated memory region 104a-n. The TPM component 110 may process this trust operation data at the operation 704.

At the operation 706, results of the trust operation data processing may be returned to the coherent computing node associated with the particular memory region of the operation 704. For example, the TPM component 110 may return results of the processing of trust operation data from one of the memory regions 104a-n to the associated coherent computing node 102a-n. The process 700 may then end.

Figure 8:
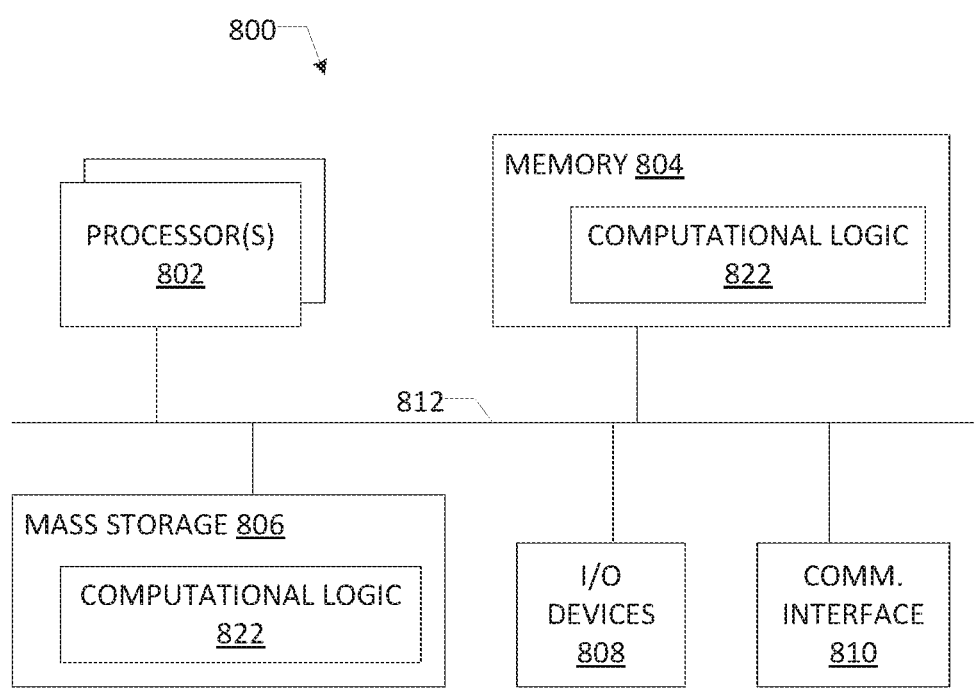
FIG. 8 is a block diagram of an example computing platform that may be suitable for practicing the disclosed embodiments

FIG. 8 is a block diagram of an example computing platform 800 that may be suitable for practicing the disclosed embodiments (e.g., the embodiments discussed above with reference to the computing system 100 of FIG. 1). In some embodiments, the computing platform 800 may be configured to provide one or more coherent computing nodes (such as the coherent computing nodes 102a-n). For example, different ones of the processors 802 of the computing platform 800 may provide different ones of the coherent computing nodes 102a-n. In some embodiments, each of the coherent computing nodes 102a-n of the computing system 100 may include a computing platform such as the computing platform 800. Various other elements of the computing platform 800 may be shared between multiple coherent computing nodes or may be separate for different coherent computing nodes. The computing platform 800 may include, or be part of, any of a number of computing systems, such as a server computing system.

As shown, the computing platform 800 includes a number of processing devices 802, and a system memory 804. The processing devices 802 may include one or more processing cores or other processing devices. Additionally, the computing platform 800 may include one or more mass storage devices 806 (such as solid-state drive, diskette, hard drive, compact disc read only memory (CDROM) and so forth), input/output devices 808 (such as display, keyboard, cursor control, camera, microphone, GPS receiver, motion detectors, and so forth) and communication interfaces 810 (such as network interface cards, modems, WiFi devices, Bluetooth devices, and so forth). The elements may be coupled to each other via a system bus 812, which represents one or more buses. In the case of multiple buses, they may be bridged by one or more bus bridges (not shown). The techniques and systems described herein may be used to provide trust-related operations to any suitable component of the computing platform 800 or combination of multiple computing platforms 800.

Each of these elements may perform its conventional functions known in the art. In particular, system memory 804 and mass storage 806 may be employed to store a working copy and a permanent copy of programming instructions implementing any suitable methods disclosed herein when executed by the respective processing devices 802, herein collectively denoted as computational logic 822. For example, in some embodiments, the computing platform 800 may implement one or more of the coherent computing nodes 102a-n. In some such embodiments, the system memory 804 and the mass storage 806 may be employed to store, as computer-readable media, a working copy and a permanent copy of programming instructions implementing the method of FIG. 5, or portions thereof. In another example, in some embodiments, the computing platform 800 may implement one or more portions of the multinode hub 120. In some such embodiments, the system memory 804 and the mass storage 806 may be employed to store a working copy and a permanent copy of programming instructions implementing the methods of FIGS. 5 and/or 6, or portions thereof. The various components may be implemented by assembler instructions supported by processing devices 802 or high-level languages, such as, for example, C, that can be compiled into such instructions.

The permanent copy of the programming instructions may be placed into permanent storage 806 in the factory, or in the field, through, for example, a computer-readable distribution medium (not shown), such as a compact disc (CD), or through communication interface 810 (e.g., from a distribution server (not shown)). That is, one or more computer-readable distribution media having an implementation of the multinode hub (or portions thereof) may be employed to distribute the multinode hub (or portions thereof) and program various computing devices. The constitution of elements 802-812 are known, and accordingly will not be further described.

In various embodiments, one or more of the elements of the computing platform 800 illustrated in FIG. 8 may not be included, or additional components may be included. For example, in some embodiments in which the computing platform 800 is configured to implement the multinode hub 120, the computing platform 800 may not include I/O devices 808. In some embodiments in which the computing platform 800 is configured to implement a coherent computing node 102, the communication interface 810 may include an interface to the communication link 112 and/or the communication link 112 itself.

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques.

The following paragraphs provide illustrative embodiments of the present disclosure. Example 1 is a multinode hub, including: a plurality of memory regions, each memory region associated with one of a plurality of coherent computing nodes and to receive trust operation data from the associated coherent computing node; a trapping module, coupled with the plurality of memory regions, to generate trap notifications in response to accesses to the plurality of memory regions by the associated plurality of coherent computing nodes, wherein a trap notification indicates which of the plurality of memory regions has been accessed; and a TPM component, coupled with the trapping module, to process trust operation data in a memory region indicated by a trap notification.

Example 2 may include the subject matter of Example 1, and may further specify that the TPM component is to verify an integrity of a BIOS of the coherent computing node associated with the memory region indicated by the trap notification, as part of processing of the trust operation data in the memory region indicated by the trap notification.

Example 3 may include the subject matter of any of Examples 1 and 2, and may further specify that the TPM component is to verify a launch of a hypervisor by the coherent computing node associated with the memory region indicated by the trap notification, as part of processing the trust operation data in the memory region indicated by the trap notification.

Example 4 may include the subject matter of any of Examples 1-3, and may further include non re-writeable memory, wherein firmware associated with the multinode hub is disposed in the non re-writeable memory.

Example 5 may include the subject matter of any of Examples 1-4, and may further specify that the multinode hub is included in an integrated circuit package along with the plurality of coherent computing nodes.

Example 6 may include the subject matter of any of Examples 1-5, and may further include one or more serial or parallel buses to couple the plurality of coherent computing nodes with the associated plurality of memory regions to enable the plurality of coherent computing nodes to communicate with the associated plurality of memory regions.

Example 7 may include the subject matter of any of Examples 1-4, and may further specify that the multinode hub is included in an integrated circuit package separate from a package including at least one of the plurality of coherent computing nodes.

Example 8 may include the subject matter of any of Examples 1-7, and may further specify that the plurality of memory regions is to receive trust operation data from an operating system of the associated coherent computing node.

Example 9 may include the subject matter of any of Examples 1-8, and may further specify that base addresses of the plurality of memory regions are included in ACPI tables of the associated coherent computing nodes.

Example 10 may include the subject matter of any of Examples 1-9, and may further specify that the plurality of memory regions is to receive trust operation data via a DMA transfer from the associated coherent computing node.

Example 11 may include the subject matter of any of Examples 1-10, and may further include a UEFI PI SMM driver having firmware associated with the multinode hub.

Example 12 may include the subject matter of any of Examples 1-11, and may further specify that the TPM component includes a memory, and the TPM component is to process trust operation data from memory regions associated with different coherent computing nodes in the memory.

Example 13 is a computing system having a multinode hub, including: a plurality of coherent computing nodes; and the multinode hub. The multinode hub includes: a plurality of memory regions, each memory region associated with one of the plurality of coherent computing nodes and to receive trust operation data from the associated coherent computing node; a trapping module, coupled with the plurality of memory regions, to generate trap notifications in response to accesses to the plurality of memory regions by the associated plurality of coherent computing nodes, wherein a trap notification indicates which of the plurality of memory regions has been accessed; and a TPM component, coupled with the trapping module, to process trust operation data in a memory region indicated by a trap notification.

Example 14 may include the subject matter of Example 13, and may further specify that the multinode hub is included in an integrated circuit package along with the plurality of coherent computing nodes.

Example 15 may include the subject matter of Example 13, and may further include one or more serial or parallel buses to couple the plurality of coherent computing nodes with the associated plurality of memory regions to enable the plurality of coherent computing nodes to communicate with the associated plurality of memory regions.

Example 16 may include the subject matter of Example 13, and may further specify that the multinode hub is included in an integrated circuit package separate from a package including at least one of the plurality of coherent computing nodes.

Example 17 may include the subject matter of any of Examples 13-16, and may further specify that the TPM component includes a memory, and that the TPM component is to process trust operation data from memory regions associated with different coherent computing nodes in the memory.

Example 18 is a method of processing trust operation data on a multinode hub, including: receiving, by a TPM component of the multinode hub, a trap notification indicative of an access to a memory region by a coherent computing node associated with the memory region, wherein the memory region is one of a plurality of memory regions in the trap notification further indicates which of the plurality of memory regions has been accessed; processing, by the TPM component, trust operation data from the memory region in response to receiving the trap notification; and providing, by the TPM component, results of the processing of the trust operation data from the memory region to the coherent computing node.

Example 19 may include the subject matter of Example 18, and may further specify that providing results of the trust operation data processing to the coherent computing node associated with the memory region includes providing results of the trust operation data processing to the memory region.

Example 20 may include the subject matter of any of examples 18-19, and may further include receiving, by the TPM component, a second trap notification indicative of an access to a second memory region by a second coherent computing node associated with the second memory region, wherein the second memory region is different from the memory region; processing, by the TPM component, trust operation data from the second memory region in response to receiving the trap notification, wherein processing the trust operation data from the second memory region comprises utilizing a memory also utilized for processing the trust operation data from the first memory region; and providing, by the TPM component, results of the processing of the trust operation data from the second memory region to the second coherent computing node.

Example 21 is a method of initializing a multinode hub, including: receiving, by the multinode hub, a base address for each of a plurality of memory regions from each of an associated plurality of coherent computing nodes; storing, by the multinode hub, the received plurality of base addresses; and generating, by the multinode hub, a trap notification for a TPM component of the multinode hub, in response to an access, by an associated coherent computing node, of a memory region of the plurality of memory regions, wherein the trap notification indicates which of the plurality of memory regions has been accessed.

Example 22 may include the subject matter of Example 21, and may further include generating, by the multinode hub, a second trap notification for the TPM component in response to an access, by an associated second coherent computing node, of a second memory region of the plurality of memory regions, wherein the second memory region is different from the memory region.

Example 23 may include the subject matter of Example 22, and may further specify that generating includes generating, by a first trap component of a trapping module of the multinode hub, the trap notification and generating, by a second trap component of the trapping module of the multinode hub, the second trap notification, and wherein the first trap component and the second trap component included different hardware.

Example 24 may include the subject matter of any of Examples 21-23, and may further specify that the plurality of base addresses comprises at least one DMA base address.

Example 25 is one or more computer-readable media having instructions thereon that, in response to execution by one or more processing devices of an apparatus, cause the apparatus to perform the method of any of Examples 18-24.

Example 26 is an apparatus comprising means for performing the method of any of Examples 18-24.

Example 27 is one or more computer-readable media having instructions thereon that, in response to execution by one or more processing devices of an apparatus, cause the apparatus to operate a TPM component of a multinode hub to: receive a trap notification indicative of an access to a memory region by a coherent computing node associated with the memory region, wherein the memory region is one of a plurality of memory regions in the trap notification further indicates which of the plurality of memory regions has been accessed; process trust operation data from the memory region in response to receiving the trap notification; and provide results of the processing of the trust operation data from the memory region to the coherent computing node.

Example 28 may include the subject matter of Example 27, and may further specify that provide results of the trust operation data processing to the coherent computing node associated with the memory region comprises provide results of the trust operation data processing to the memory region.

Example 29 may include the subject matter of any of Examples 27-28, and may further have instructions thereon that, in response to execution by the one or more processing devices of the apparatus, cause the apparatus to operate the TPM component of the multinode hub to: receive a second trap notification indicative of an access to a second memory region by a second coherent computing node associated with the second memory region, wherein the second memory region is different from the memory region; process trust operation data from the second memory region in response to receiving the trap notification, wherein processing the trust operation data from the second memory region comprises utilizing a memory also utilized for processing the trust operation data from the first memory region; and provide results of the processing of the trust operation data from the second memory region to the second coherent computing node.

Example 30 is one or more computer-readable media having instructions thereon that, in response to execution by one or more processing devices of an apparatus, cause the apparatus to operate a multinode hub to: receive a base address for each of a plurality of memory regions from each of an associated plurality of coherent computing nodes; store the received plurality of base addresses; and generate a trap notification for a TPM component of the multinode hub, in response to an access, by an associated coherent computing node, of a memory region of the plurality of memory regions, wherein the trap notification indicates which of the plurality of memory regions has been accessed.

Example 31 may include the subject matter of Example 30, and may further have instructions thereon that, in response to execution by the one or more processing devices of the apparatus, cause the apparatus to operate the multinode hub to generate a second trap notification for the TPM component in response to an access, by an associated second coherent computing node, of a second memory region of the plurality of memory regions, wherein the second memory region is different from the memory region.

Example 32 may include the subject matter of Example 31, and may further specify that generate comprises generate, by a first trap component of a trapping module of the multinode hub, the trap notification and generate, by a second trap component of the trapping module of the multinode hub, the second trap notification, and wherein the first trap component and the second trap component included different hardware.

Example 33 may include the subject matter of any of Examples 30-32, and may further specify that the plurality of base addresses comprises at least one Direct Memory Access (DMA) base address.

What is claimed is:

1. A multinode hub, comprising:
a plurality of memory regions, wherein each respective memory region is associated with a respective associated coherent computing node of a plurality of coherent computing nodes and to receive trust operation data only from its respective associated coherent computing node, and wherein each of the respective coherent computing nodes sends trust operation data only to its respective associated memory region out of the plurality of memory regions; and
a trusted platform module (TPM) component to process trust operation data in one of the memory regions indicated by a trap notification from a trapping module, wherein a trap notification indicates which of the plurality of memory regions has been accessed.

2. The multinode hub of claim 1, wherein the TPM component is to verify an integrity of a basic input/output system (BIOS) of the coherent computing node associated with the memory region indicated by the trap notification, as part of processing of the trust operation data in the memory region indicated by the trap notification.

3. The multinode hub of claim 1, wherein the TPM component is to verify a launch of a hypervisor by the coherent computing node associated with the memory region indicated by the trap notification, as part of processing the trust operation data in the memory region indicated by the trap notification.

4. The multinode hub of claim 1, further comprising:
the trapping module, coupled with the plurality of memory regions and the TPM component, to generate the trap notification in response to an access to the indicated memory region by the associated coherent computing node.

5. The multinode hub of claim 1, further comprising non re-writeable memory, wherein firmware associated with the multinode hub is disposed in the non re-writeable memory.

6. The multinode hub of claim 1, wherein the multinode hub is included in an integrated circuit package along with the plurality of coherent computing nodes.

7. The multinode hub of claim 1, further comprising one or more serial or parallel buses to couple the plurality of coherent computing nodes with the associated plurality of memory regions to enable the plurality of coherent computing nodes to communicate with the associated plurality of memory regions.

8. The multinode hub of claim 1, wherein the multinode hub is included in an integrated circuit package separate from a package including at least one of the plurality of coherent computing nodes.

9. The multinode hub of claim 1, wherein the plurality of memory regions is to receive trust operation data from an operating system of the associated coherent computing node.

10. The multinode hub of claim 1, wherein base addresses of the plurality of memory regions are included in Advanced Configuration and Power Interface (ACPI) tables of the associated coherent computing nodes.

11. The multinode hub of claim 1, wherein the plurality of memory regions is to receive trust operation data via a Direct Memory Access (DMA) transfer from the associated coherent computing node.

12. The multinode hub of claim 1, further comprising a Unified Extensible Firmware Interface (UEFI) Platform Initialization (PI) System Management Mode (SMM) driver having firmware associated with the multinode hub.

13. The multinode hub of claim 1, wherein the TPM component comprises a memory, and wherein the TPM component is to process trust operation data from memory regions associated with different coherent computing nodes in the memory.

14. A computing system having a multinode hub, comprising:
a plurality of coherent computing nodes; and
the multinode hub, wherein the multinode hub comprises:
a plurality of memory regions, wherein each respective memory region is associated with a respective associated coherent computing node of the plurality of coherent computing nodes and to receive trust operation data only from its respective associated coherent computing node, and wherein each of the respective coherent computing nodes sends trust operation data only to its respective associated memory region out of the plurality of memory regions; and
a trusted platform module (TPM) component to process trust operation data in one of the memory regions indicated by a trap notification from a trapping module, wherein a trap notification indicates which of the plurality of memory regions has been accessed.

15. The computing system of claim 14, wherein the multinode hub further comprises the trapping module, coupled with the plurality of memory regions, to generate the trap notification in response to an access to the indicated one of the memory regions by the respective associated coherent computing node.

16. The computing system of claim 14, wherein the multinode hub is included in an integrated circuit package along with the plurality of coherent computing nodes.

17. The computing system of claim 14, further comprising one or more serial or parallel buses to couple the plurality of coherent computing nodes with the associated plurality of memory regions to enable the plurality of coherent computing nodes to communicate with the associated plurality of memory regions.

18. The computing system of claim 14, wherein the multinode hub is included in an integrated circuit package separate from a package including at least one of the plurality of coherent computing nodes.

19. The computing system of claim 14, wherein the TPM component comprises a memory, and wherein the TPM component is to process trust operation data from memory regions associated with different coherent computing nodes in the memory.

* * * * *